(12) United States Patent
Sanderson et al.

(10) Patent No.: US 9,145,702 B2
(45) Date of Patent: Sep. 29, 2015

(54) FRICTION DAMPING MECHANISM FOR DAMPED BEAMS AND OTHER STRUCTURES

(71) Applicant: Raytheon Company, Waltham, MA (US)

(72) Inventors: Terry M. Sanderson, Tucson, AZ (US); Frederick B. Koehler, Tucson, AZ (US); Thomas P. McCreery, Tucson, AZ (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 13/760,665

(22) Filed: Feb. 6, 2013

(65) Prior Publication Data

US 2014/0215936 A1    Aug. 7, 2014

(51) Int. Cl.
| | |
|---|---|
| *E04H 9/02* | (2006.01) |
| *F16F 7/10* | (2006.01) |
| *E01D 19/04* | (2006.01) |
| *E01D 19/00* | (2006.01) |
| *F16F 7/00* | (2006.01) |
| *E04B 1/98* | (2006.01) |

(52) U.S. Cl.
CPC ............... *E04H 9/023* (2013.01); *E01D 19/00* (2013.01); *E01D 19/043* (2013.01); *E04H 9/027* (2013.01); *F16F 7/00* (2013.01); *F16F 7/1022* (2013.01); *E04B 1/985* (2013.01)

(58) Field of Classification Search
CPC ......... E04H 9/027; E04H 9/023; E04H 9/029; E04B 1/985; F16F 7/1022; F16F 7/00
USPC ............ 52/167.9, 167.5, 167.4, 167.1, 167.8; 248/560, 562, 563, 566, 568; 384/36, 384/44–46, 99, 101, 491–492, 513, 565, 384/261; 188/381, 378, 379, 380; 267/205, 267/41, 182
See application file for complete search history.

(56) References Cited

U.S. PATENT DOCUMENTS

| | | | | |
|---|---|---|---|---|
| 2,014,643 | A * | 9/1935 | Bakker | ............................ 384/49 |
| 4,883,250 | A * | 11/1989 | Yano et al. | ..................... 248/638 |
| 5,689,919 | A * | 11/1997 | Yano | ............................ 52/167.6 |

(Continued)

FOREIGN PATENT DOCUMENTS

| | | | |
|---|---|---|---|
| GB | 936388 | A * | 9/1963 |
| GB | 1085322 | A * | 9/1967 |

(Continued)

*Primary Examiner* — Joshua J Michener
*Assistant Examiner* — Babajide Demuren

(57) ABSTRACT

A system includes a structure configured to undergo oscillatory movement. The system also includes a friction damping clamp coupled to the structure. The friction damping clamp includes a housing having a groove. The friction damping clamp also includes a roller positioned at least partially within the groove, where the groove has first and second ramps. The roller is configured to move up each ramp of the groove so that more compression is applied on the structure and to move down each ramp of the groove so that less compression is applied on the structure. The roller may be configured to apply more compression on the structure to increase friction between portions of the structure, to apply less compression on the structure to decrease friction between the portions of the structure, and to apply substantially no compression on the structure when the roller is located at a center of the groove.

20 Claims, 14 Drawing Sheets

(56) References Cited

U.S. PATENT DOCUMENTS

| | | | |
|---|---|---|---|
| 6,123,313 A * | 9/2000 | Otsuka et al. | 248/580 |
| 6,321,492 B1 * | 11/2001 | Robinson | 52/167.1 |
| 6,325,351 B1 * | 12/2001 | Hale et al. | 248/562 |
| 6,391,456 B1 * | 5/2002 | Krishnaswamy et al. | 428/411.1 |
| 6,505,806 B1 * | 1/2003 | Glaesener | 248/638 |
| 6,675,539 B2 * | 1/2004 | Shreiner | 52/66 |
| 6,971,795 B2 * | 12/2005 | Lee et al. | 384/36 |
| 7,028,433 B2 * | 4/2006 | Liu | 52/167.3 |
| 2002/0166296 A1 * | 11/2002 | Kim | 52/167.5 |
| 2004/0131287 A1 * | 7/2004 | Lee et al. | 384/36 |
| 2009/0123096 A1 * | 5/2009 | Shirai | 384/45 |
| 2011/0167759 A1 * | 7/2011 | Cesternino | 52/834 |
| 2011/0188995 A1 * | 8/2011 | Thomassin et al. | 415/119 |

FOREIGN PATENT DOCUMENTS

| | | | | |
|---|---|---|---|---|
| JP | 02017240 A | * | 1/1990 | F16F 15/08 |
| JP | 02054040 A | * | 2/1990 | E04B 1/36 |

* cited by examiner

FRICTION DAMPING MECHANISM FOR DAMPED BEAMS AND OTHER STRUCTURES

GOVERNMENT LICENSE RIGHTS

This invention was made with U.S. government support under Contract No. HR0011-11-C-0069 awarded by the Defense Advanced Research Projects Agency (DARPA). The U.S. government may have certain rights in the invention.

TECHNICAL FIELD

This disclosure is generally directed to damping mechanisms. More specifically, this disclosure relates to a friction damping mechanism for damped beams and other structures.

BACKGROUND

Damping refers to the action of reducing back-and-forth oscillations of a structure until it comes to rest. Many types of structures could benefit from high levels of damping. Some damping solutions involve the use of viscous or elastomeric devices, such as dashpots and elastomeric isolators. However, these devices are typically bulky and add considerable weight to the overall structure. Other damping solutions involve the use of friction dampers with beams formed from multiple layers that can slip against each other. Unfortunately, these "split beam" friction dampers typically result in permanent offset after excitation, meaning a beam cannot return to its beginning or "home" position after oscillatory movement is incited. Moreover, conventional "split beam" friction dampers can typically access only a fraction of the total damping power that is contained within a beam.

SUMMARY

This disclosure provides a friction damping mechanism for damped beams and other structures.

In a first embodiment, a system includes a structure configured to undergo oscillatory movement. The system also includes a friction damping clamp coupled to the structure. The friction damping clamp includes a housing having a groove. The friction damping clamp also includes a roller positioned at least partially within the groove, where the groove has first and second ramps. The roller is configured to move up each ramp of the groove so that more compression is applied on the structure, and the roller is configured to move down each ramp of the groove so that less compression is applied on the structure.

In a second embodiment, an apparatus includes a friction damping clamp configured to be coupled to a structure that undergoes oscillatory movement. The friction damping clamp includes a housing having a groove. The friction damping clamp also includes a roller positioned at least partially within the groove, where the groove has first and second ramps. The roller is configured to move up each ramp of the groove so that more compression is applied on the structure. The roller is also configured to move down each ramp of the groove so that less compression is applied on the structure.

In a third embodiment, a method includes creating oscillatory movement of a structure and damping the oscillatory movement using a friction damping clamp coupled to the structure. The friction damping clamp includes a housing having a groove. The friction damping clamp also includes a roller positioned at least partially within the groove, where the groove has first and second ramps. Damping the oscillatory movement includes moving the roller up each ramp of the groove to apply more compression on the structure and moving the roller down each ramp of the groove to apply less compression on the structure.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1A through 11, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1A:
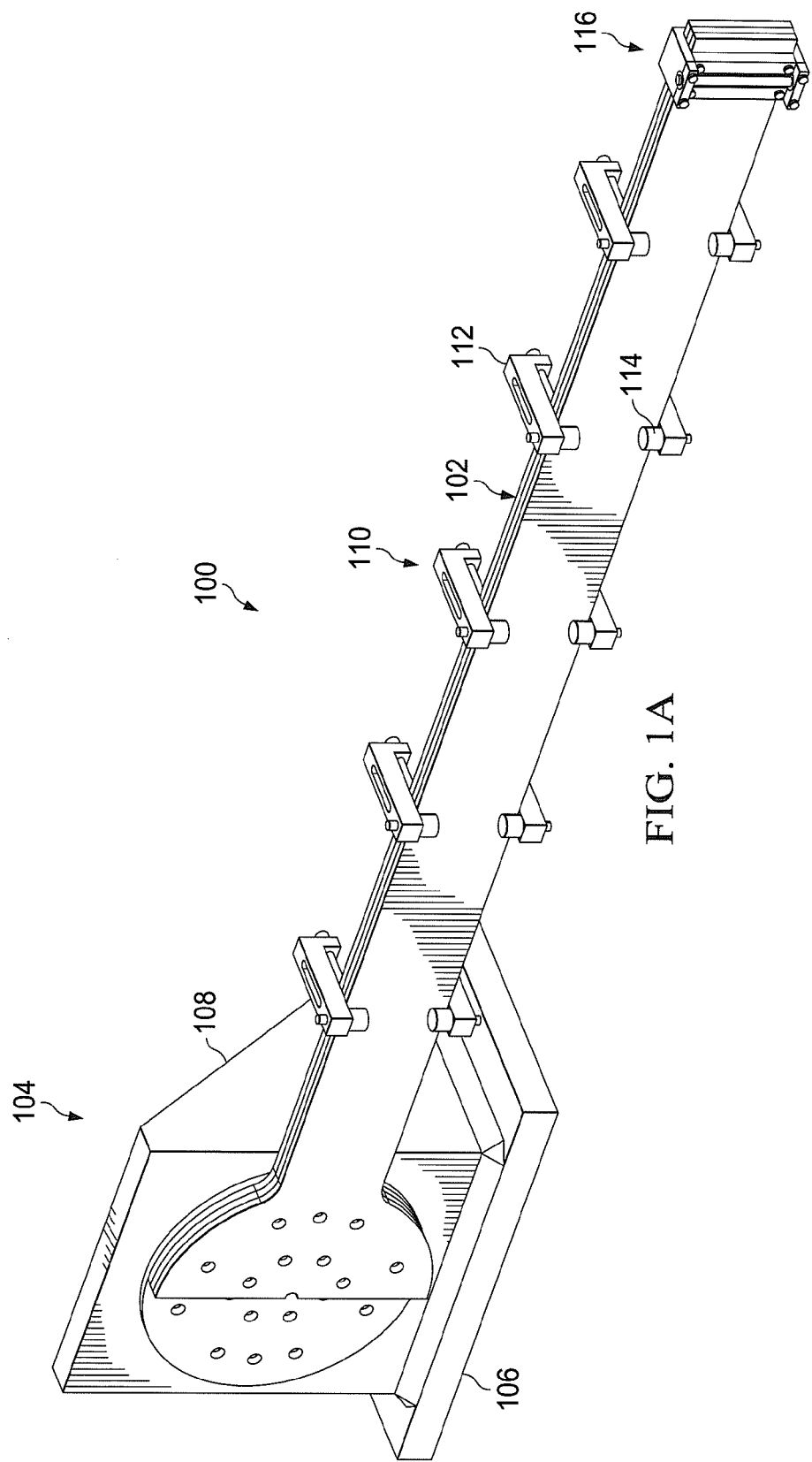
FIGS. 1A and 1B illustrate example structures with friction damping mechanisms in accordance with this disclosure.
Figure 1B:
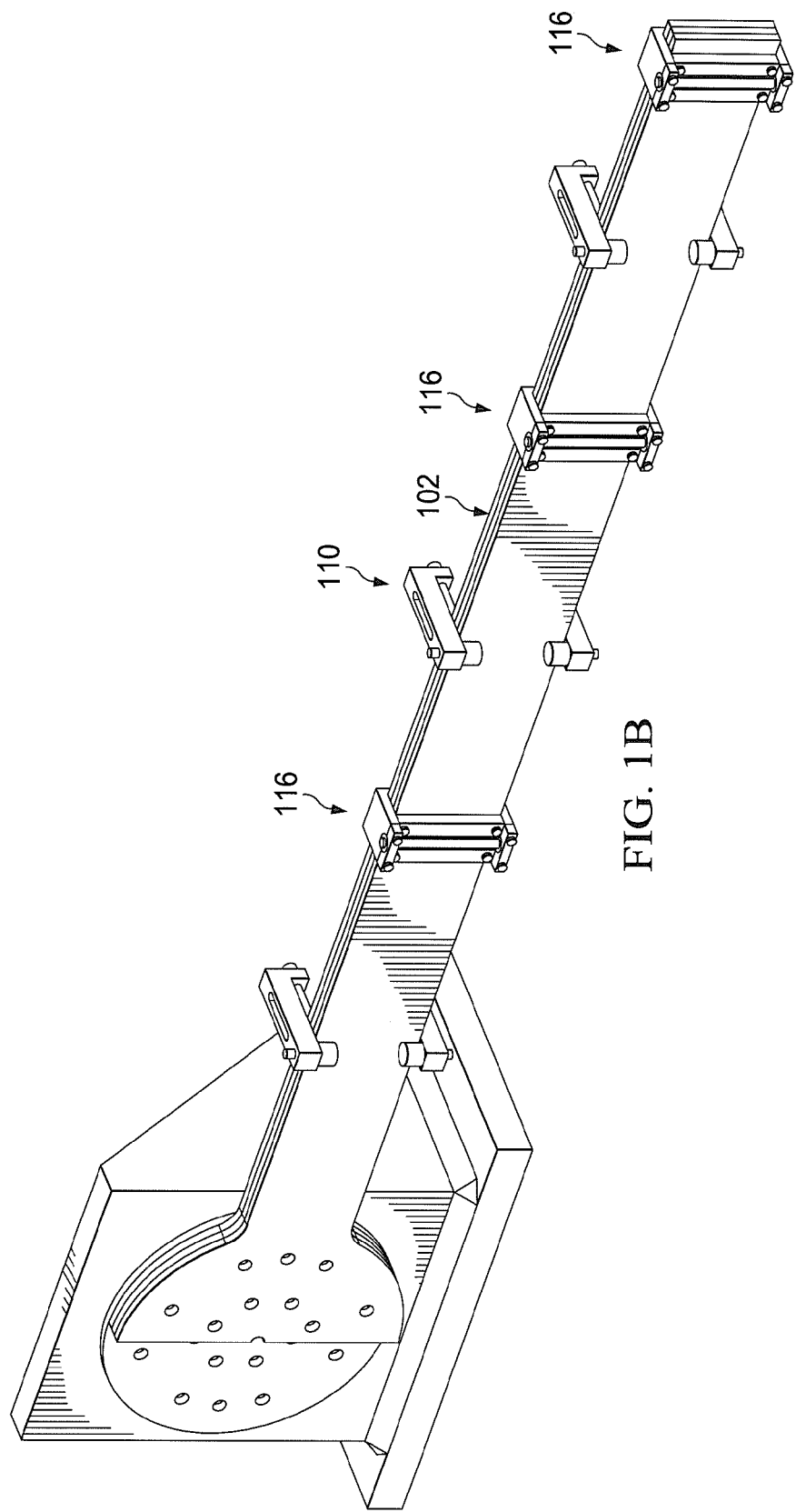

FIGS. 1A and 1B illustrate example structures with friction damping mechanisms in accordance with this disclosure. As shown in FIG. 1A, a structure 100 includes a beam 102 that is secured to a support structure 104. The beam 102 generally represents a narrower structure that is supported at one or more points by other structures. In this example, the beam 102 represents a cantilevered beam, meaning the beam 102 is supported at one end but not at the other end. However, other types of beams could also be used here, such as a fixed beam supported at both ends by support structures.

The beam 102 could be formed from any suitable material(s) and in any suitable manner. Here, the beam 102 represents a multi-layer or "split beam" structure that is formed from multiple layers of material(s), where at least one layer of the beam 102 slips with respect to at least one other layer of the beam 102. This creates one or more slip/friction planes in the beam 102, which help to dampen oscillations of the beam 102. Each layer of the beam 102 could be formed from any suitable material(s), such as stainless steel or aluminum.

The support structure 104 generally represents any suitable structure on which the beam 102 can be mounted or otherwise supported. In this example, the support structure 104 includes a base 106 and a wedge-shaped upper portion 108, where the beam 102 is coupled to a raised surface on the upper portion 108. The support structure 104 could have any other suitable size and shape. Also, the support structure 104 could be formed from any suitable material(s) and in any suitable manner. In addition, any suitable coupler(s) or other mechanisms could be used to secure the beam 102 to the support structure 104, such as bolts. In particular embodiments such as a small airplane or missile, the beam 102 could represent a wing, and the support structure 104 could represent the fuselage or center support of an airframe.

As shown in FIG. 1A, multiple anti-buckling rollers 110 are positioned along the span of the beam 102. The anti-buckling rollers 110 generally operate to prevent buckling of the beam 102, which helps to prevent shear energy in the beam 102 from converting into buckling energy. In this example, each anti-buckling roller 110 includes a roller support 112, which is coupled to one layer of the beam 102. Each roller support 112 is coupled to a movable roller 114, which helps to restrain movement of the beam 102. Each roller support 112 could be formed from any suitable material(s) (such as stainless steel or aluminum) and in any suitable manner. Each roller 114 could also be formed from any suitable material(s) and in any suitable manner.

The beam 102 further includes a friction damping clamp 116. The clamp 116 is secured to the beam 102 and generally operates to help dampen oscillations of the beam 102. The clamp 116 does this by applying variable levels of compression to the beam 102, which affects the amount of friction between the various layers of the beam 102. By allowing control of friction normal forces in various profiles, the damping provided by the clamp 116 can be tuned to utilize shear energy available in the beam 102 to a larger or maximal extent. Unlike conventional approaches, the clamp 116 allows the beam 102 to return substantially to a beginning or "home" position after oscillatory movement begins and is suppressed. This can reduce or eliminate the permanent offset typically present in conventional approaches. Moreover, the clamp 116 is designed to access a significantly larger fraction of the total damping power that is contained within the beam 102 compared to conventional approaches (and possibly allows access to all damping power of the beam 102). Additional details of the design and operation of the clamp 116 are provided below.

The friction damping clamp 116 is used in FIG. 1A near the end of the beam 102. However, at least one clamp 116 could be used in one or more other or additional locations along the beam 102. For example, the beam 102 could have any number of clamps 116, such as multiple clamps 116 distributed evenly or unevenly along the length of the beam 102. As a particular example, one or more anti-buckling rollers 110 could be replaced by one or more clamps 116. An example of this is shown in FIG. 1B, where several anti-buckling rollers 110 have been replaced with friction damping clamps 116. The remaining anti-buckling rollers 110 could also be omitted or similarly replaced with friction damping clamps 116.

Note that materials having higher coefficients of friction could be used in the beam 102 to dampen oscillations with less clamping power required from the friction damping clamp 116. Alternatively, materials having lower coefficients of friction could be used in the beam 102 to dampen oscillations with more clamping power required from the friction damping clamp 116. This provides great flexibility in both the selection of materials for the beam 102 and the design of the clamp 116.

Also note that any suitable structure could use one or more friction damping clamps 116 to reduce oscillatory movement, such as structures in buildings, bridges, vehicles, aircraft, and ships. As particular uses, the friction damping clamp 116 could find use in vehicle and ship shock absorbing systems, structural components within highly accurate mechanisms, and inertial measurement unit (IMU) isolation structures.

Although FIGS. 1A and 1B illustrate examples of structures with friction damping mechanisms, various changes may be made to FIGS. 1A and 1B. For example, the relative sizes, shapes, and dimensions of the components in FIGS. 1A and 1B are for illustration only. Also, any suitable structure can use at least one friction damping clamp 116, and any number of friction damping clamps 116 could be used with that structure.

Figure 2:
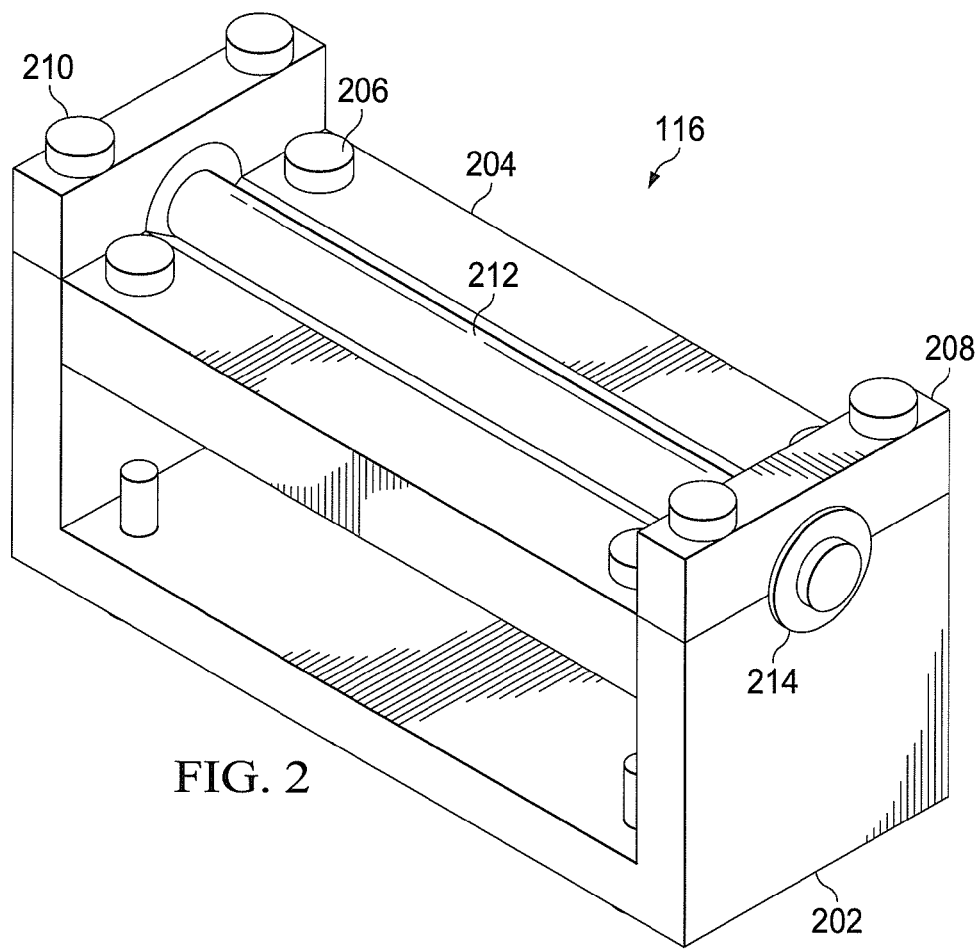
FIGS. 2 through 6 illustrate an example friction damping mechanism and related details in accordance with this disclosure.
Figure 3:
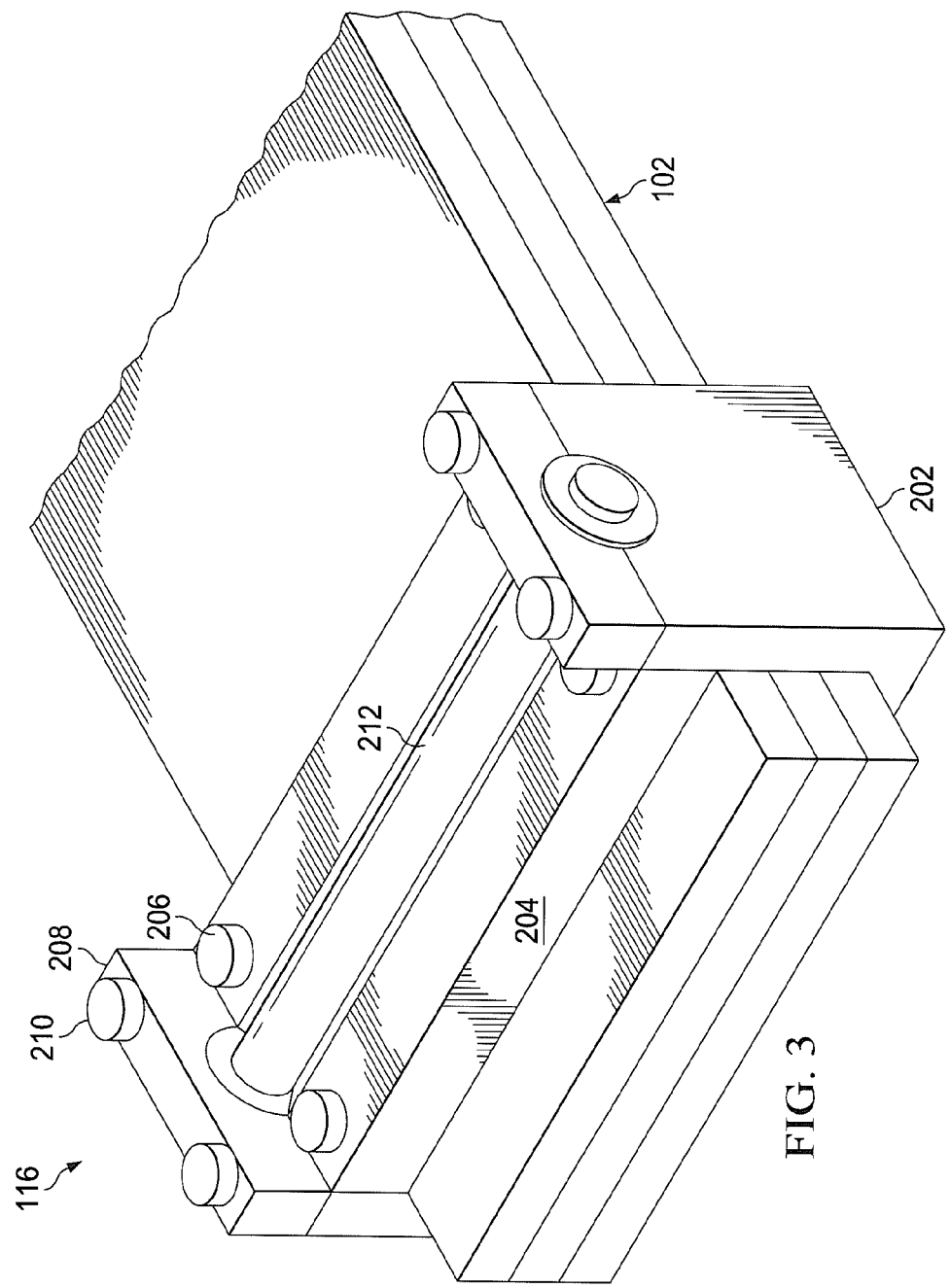

FIGS. 2 through 6 illustrate an example friction damping mechanism and related details in accordance with this disclosure. In particular, FIGS. 2 through 6 illustrate details of an example friction damping clamp 116. As shown in FIGS. 2 through 4, the clamp 116 includes a housing, which is formed by a lower housing member 202 and an upper housing member 204. The housing members 202-204 generally encircle the beam 102, which fits within an opening between the housing members 202-204. The housing members 202-204 are also secured to different layers of the beam 102 using connectors 206. Note, however, that the housing need not completely encircle the beam 102.

In this example, the lower housing member 202 extends across a bottom of the beam 102 and up the sides of the beam 102, and the upper housing member 204 fits between the upwardly-projecting sides of the lower housing member 202. However, the upper housing member 204 is not fixed to the lower housing member 202, allowing the upper housing member 204 to move closer to or farther away from the bottom of the lower housing member 202. This allows the upper housing member 204 to apply different amounts of compression to the beam 102, thereby altering the amount of friction generated between the layers of the beam 102.

Each housing member 202-204 could be formed from any suitable material(s), such as stainless steel or aluminum. Each housing member 202-204 could also be formed in any suitable manner, such as by machining or molding. Each connector 206 includes any suitable structure for coupling (either temporarily or permanently) two or more other structures together, such as bolts.

The lower housing member 202 here is coupled to multiple retainers 208, which are coupled to the lower housing member 202 using connectors 210. Each retainer 208 could be formed from any suitable material(s) (such as stainless steel or aluminum) and in any suitable manner (such as by machining or molding). Each connector 210 includes any suitable structure for coupling (either temporarily or permanently) two or more other structures together, such as bolts.

The lower housing member 202 and the retainers 208 define openings used to secure at least one roller 212 and its associated bearings 214. In this example, a single roller 212 extends completely across the beam 102, and the ends of the roller 212 with the bearings 214 are secured between the lower housing member 202 and the retainers 208. As shown in FIGS. 1A and 1B, multiple rollers could also be used in place of the single roller 212. Each roller 212 could be formed from any suitable material(s) and in any suitable manner. The bearings 214 could also be formed from any suitable material(s) and in any suitable manner.

Figure 4A:
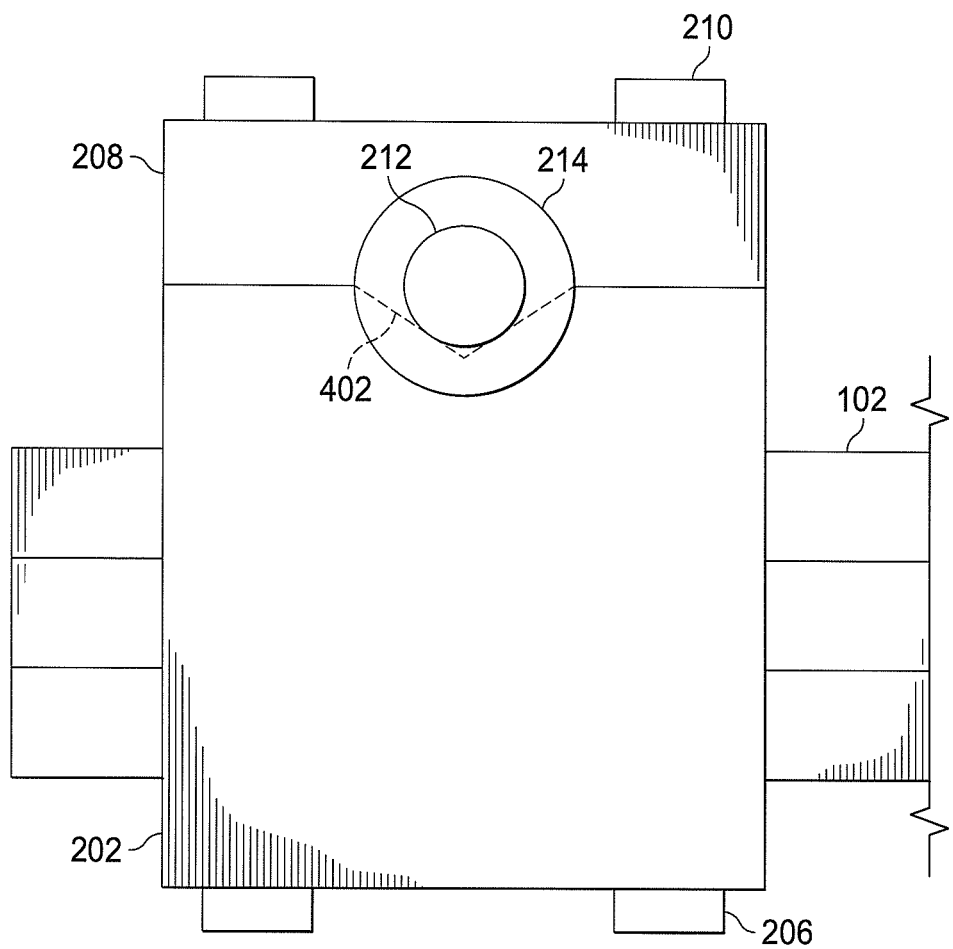
Figure 4B:
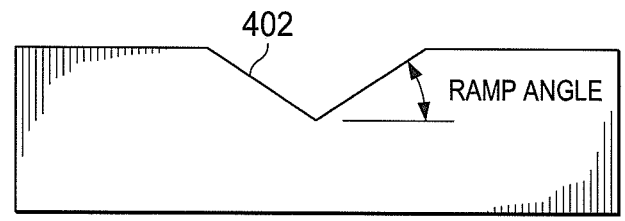

As shown in FIGS. 4A and 4B, the upper surface of the housing member 204 includes at least one groove 402. The groove 402 here is V-shaped, meaning a groove with substantially straight sides. At least a portion of each roller 212 fits within an associated groove 402. During movement of the beam 102, each roller 212 can move up and down over the slanted ramp surfaces of the groove 402. This creates a varying amount of friction in the beam 102. For example, the roller 212 forces the upper housing member 204 down against the beam 102 more when the roller 212 is higher up the groove 402, creating greater friction between the layers of the beam 102. The roller 212 forces the upper housing member 204 down against the beam 102 less when the roller 212 is lower up the groove 402, creating lesser friction between the layers of the beam 102. The roller 212 may not force the upper housing member 204 down against the beam 102 at all when the roller 212 is centered in the groove 402, creating a minimal amount of friction between the layers of the beam 102.

This allows the layers of the beam 102 to slip with respect to one another, but the amount of friction between the layers varies. This helps to more quickly dampen oscillatory movement of the beam 102. For example, if the free end of the beam 102 opposite the support structure 104 in FIGS. 1A and 1B is moved in one direction and released, the free end of the beam 102 swings back and forth. This causes the roller(s) 212 to roll up and down one side of the groove(s) 402 and then up and down the other side of the groove(s) 402. This can be repeated any number of times until each roller 212 comes to rest at the bottom of its groove 402, at which point the beam 102 is no longer oscillating.

In this example, the friction force within the beam 102 varies linearly with displacement. That is, when there is no displacement of the beam 102, each roller 212 can be located at the center of its groove 402, at which point there is little or no friction created by that roller 212. Displacement in either direction causes each roller 212 to roll up one side of its groove 402, increasing the friction experienced between the layers of the beam 102. Higher movements up the side(s) of the groove(s) 402 create larger amounts of friction, while smaller movements up the side(s) of the groove(s) 402 create smaller amounts of friction.

In this way, the clamp 116 creates variable friction that increases with displacement of the beam's layers, helping to more rapidly stop oscillatory movement of the beam 102. Moreover, there is no or substantially no friction present when each roller 212 is located in the center of its groove 402, so each roller 212 can return to substantially the same position (the "home" position) after each displacement of the beam 102. This can eliminate permanent offset of the beam's position, which is common in conventional solutions. In addition, the bolts 206 used to secure the upper housing member 204 to the beam 102 could be adjustable, allowing the upper housing member 204 to reside a desired distance above the beam 102. This allows for the tuning of the friction force applied to the beam 102.

The materials used to form the various components of the clamp 116 could vary depending on the application. For example, various components could be formed from materials selected for friction consistency and wear resistance based on given or expected loading conditions in a particular application. Also, the clamp 116 could be designed to have a desired overall stiffness, such as a stiffness based on the inverted beam-to-clamp cross sectional area ratio. In some embodiments, the clamp 116 is approximately ten times stiffer than the beam 102.

Moreover, the ramp angle of the groove 402 (defined as shown in FIG. 4B) could be optimized based on the expected shear stress in the beam 102. Under classical beam theory, the available shear flow q of a beam can be defined as:

$$q = \frac{6F_e}{h^3}\left[\left(\frac{h}{2}\right)^2 - y_1^2\right]$$

where $F_e$ denotes the applied beam tip load, h denotes the beam's height (the overall thickness of its layers), and $y_1$ denotes distance from the beam's neutral axis to the centroid of the section under study. With this in mind, the ramp angle of the groove 402 can be selected to match the available shear force q of the beam 102. If the ramp angle of the groove 402 is too small, the clamp 116 can still provide damping and return the beam 102 to its expected "home" position, but the amount of damping is smaller than when the ramp angle matches the available shear force. If the ramp angle of the groove 402 is too large, the clamp 116 may fail to return the beam 102 to its home position.

Figure 5A:
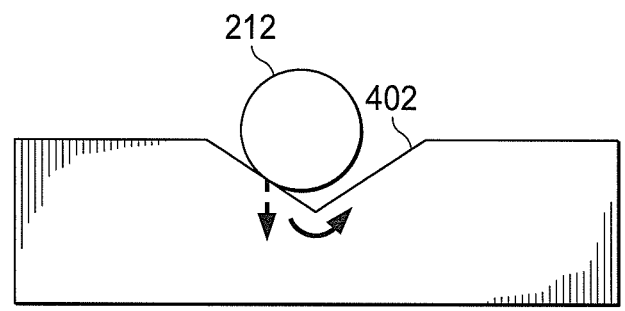
Figure 5B:
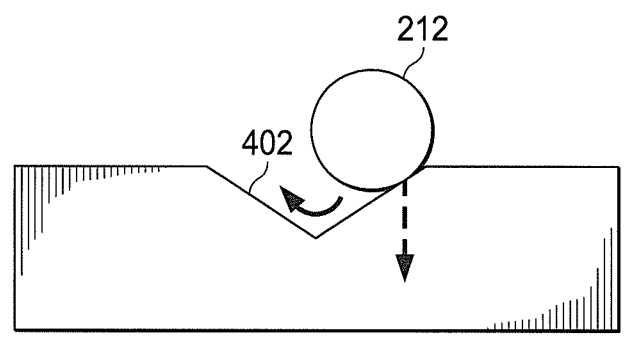

FIGS. 5A and 5B illustrate an example movement of the roller 212 in the groove 402. As shown in FIG. 5A, the roller 212 is approaching the bottom of the groove 402. Because the clamp 116 is fixed to the beam 102 and the roller 212 is lower within the groove 402, the roller 212 here applies a smaller amount of downward compression against the underlying beam. As shown in FIG. 5B, the roller 212 has reached the top of the groove 402 and is beginning to move downward again towards the bottom of the groove 402. Because the clamp 116 is fixed to the beam 102 and the roller 212 is higher within the groove 402, the roller 212 here applies a larger amount of downward compression against the underlying beam.

Figure 6:
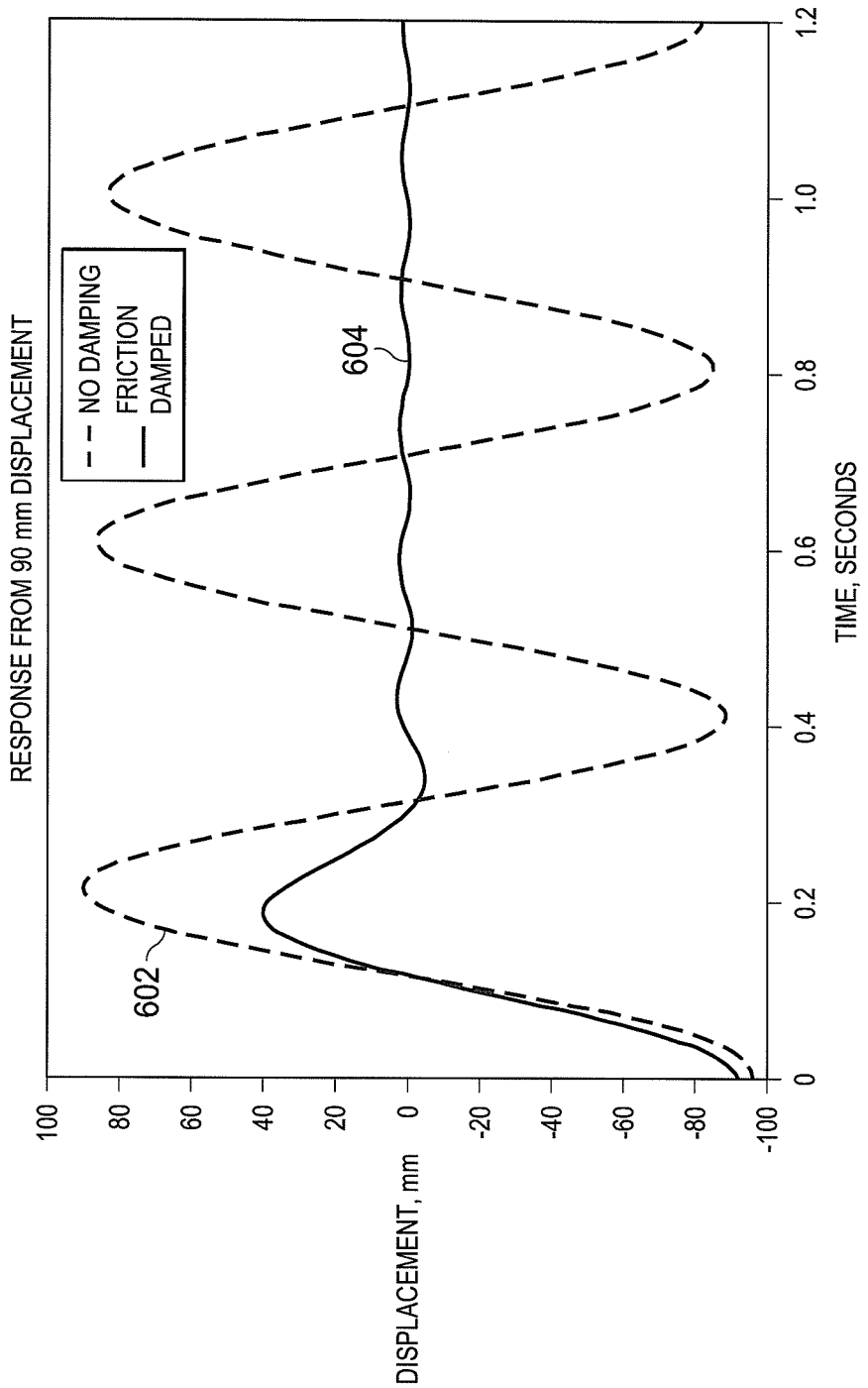

FIG. 6 illustrates example effects that could be achieved using the friction damping clamp 116 on a beam. In FIG. 6, a line 602 denotes the displacement of a beam's tip after the beam is moved and then released, where the beam lacks a friction damping clamp 116. A line 604 denotes the displacement of a beam's tip after the beam is moved and then released, where the beam includes a friction damping clamp 116. As can be seen here, movement of the beam with the friction damping clamp 116 rapidly moves to zero, showing that the friction damping clamp 116 quickly dampens the oscillatory movement of its beam. In contrast, the beam without the friction damping clamp 116 continues with large movements, indicating that a much longer period of time is needed to stop the oscillatory movement of that beam.

As can be seen here, the use of at least one friction damping clamp 116 can rapidly reduce oscillatory movement of a beam or other structure. This can be accomplished in a manner that allows the beam or other structure to return to its desired "home" position. This can also be accomplished without unnecessarily reducing the stiffness of the structure. In addition, this can be accomplished using a much larger percentage of the total damping power that is contained within a beam or other structure.

Although FIGS. 2 through 6 illustrate one example of a friction damping mechanism and related details, various changes may be made to FIGS. 2 through 6. For example, the sizes, shapes, and relative dimensions of the components in the friction damping clamp 116 are for illustration only and may vary depending on particular circumstances. Also, as noted above, a single roller 212 or multiple rollers 212 could be used with one or multiple grooves 402 to provide friction damping. In addition, the groove 402 could have other shapes and need not be V-shaped. For instance, the groove 402 could have a parabolic shape or a step configuration.

Figure 7:
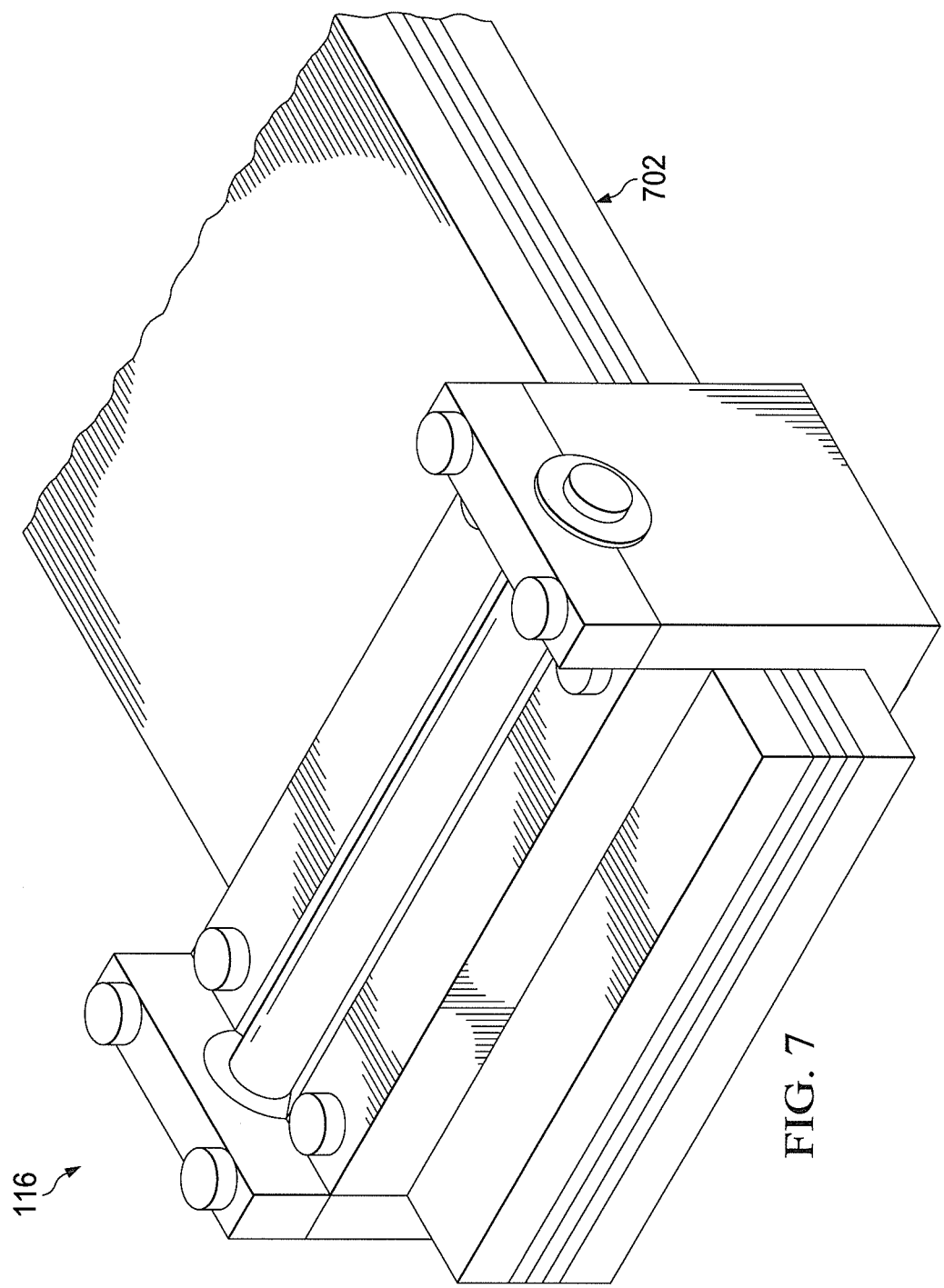
FIGS. 7 through 9 illustrate additional structures with friction damping mechanisms in accordance with this disclosure.
Figure 8A:
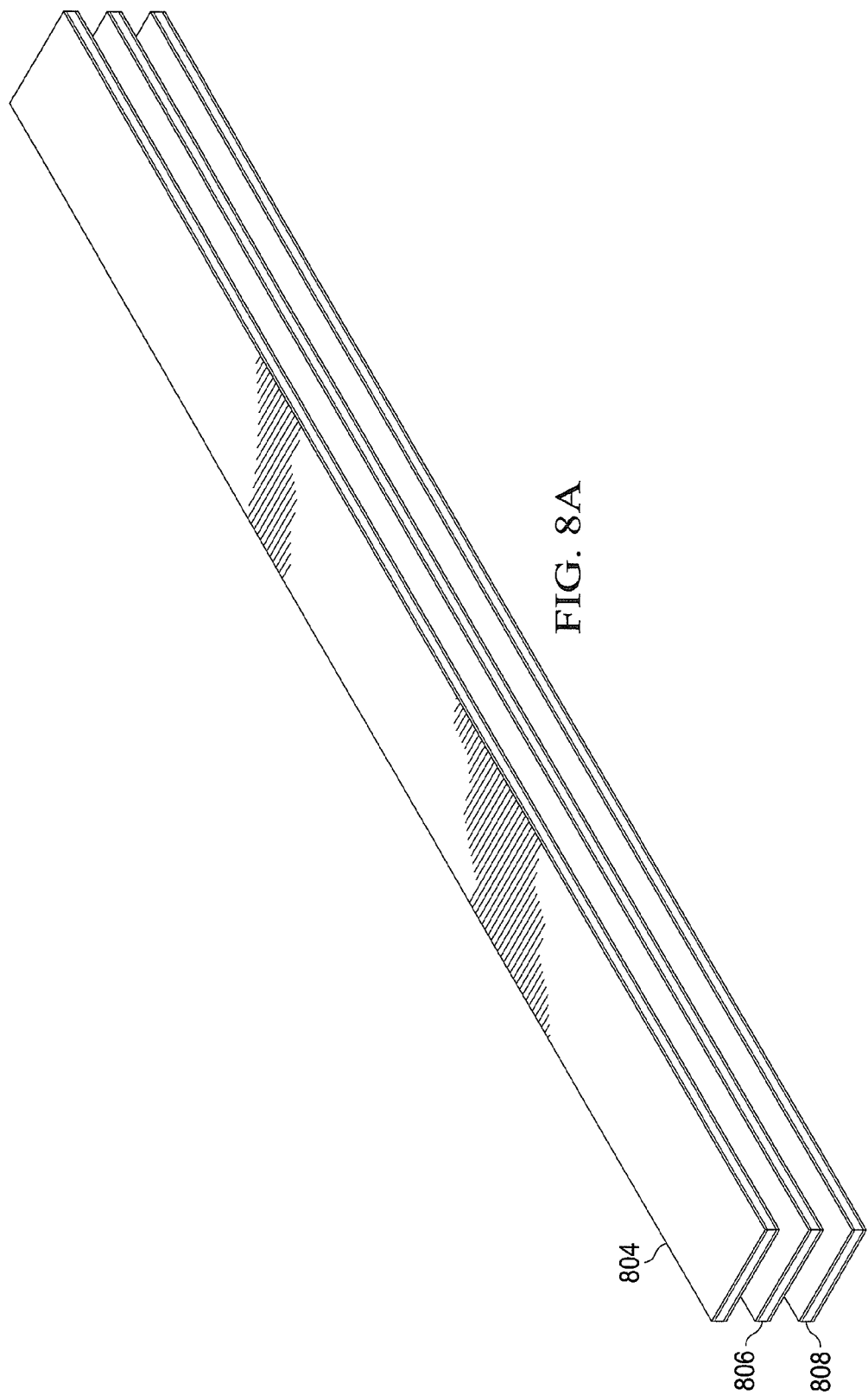
Figure 8B:
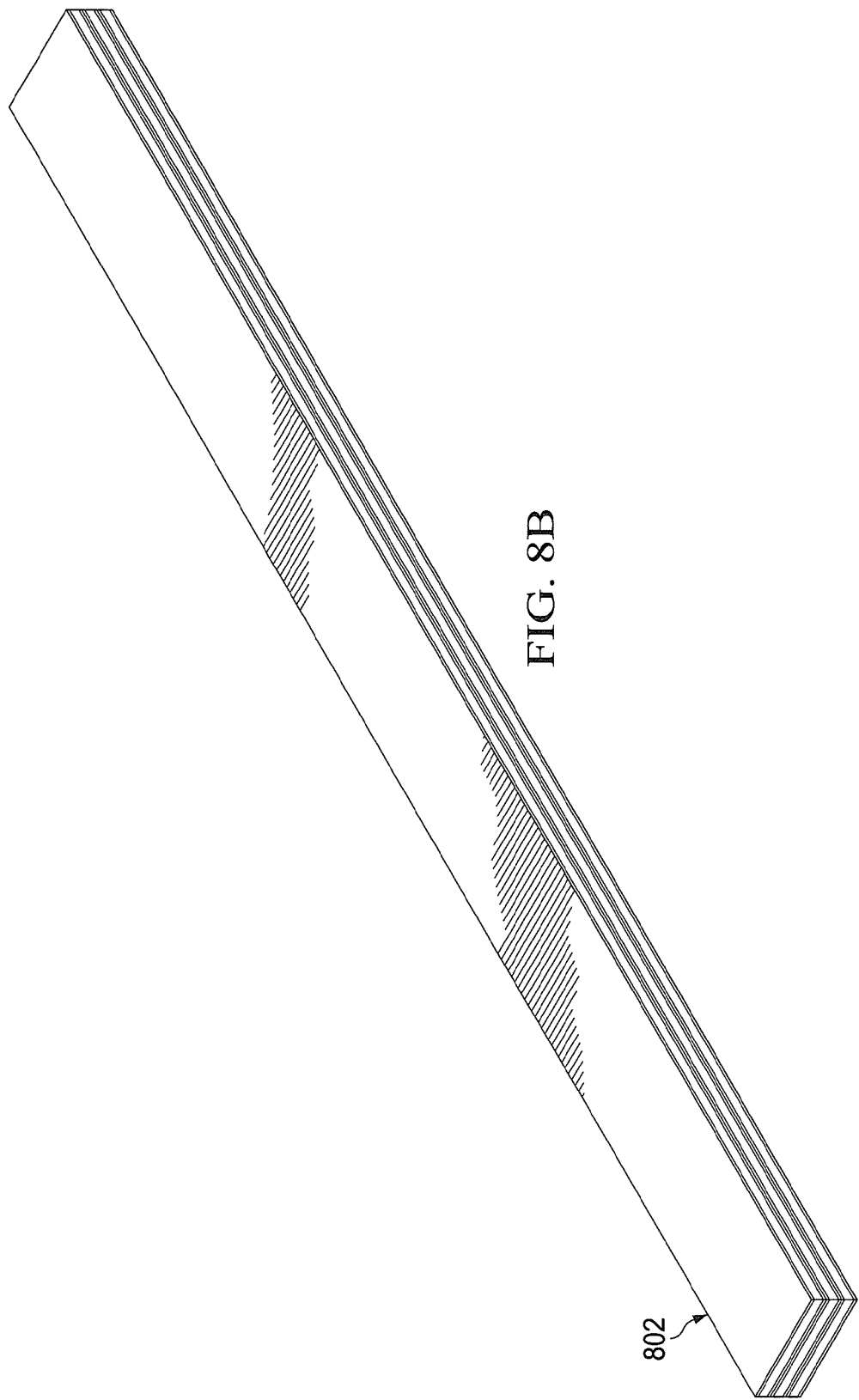
Figure 8C:
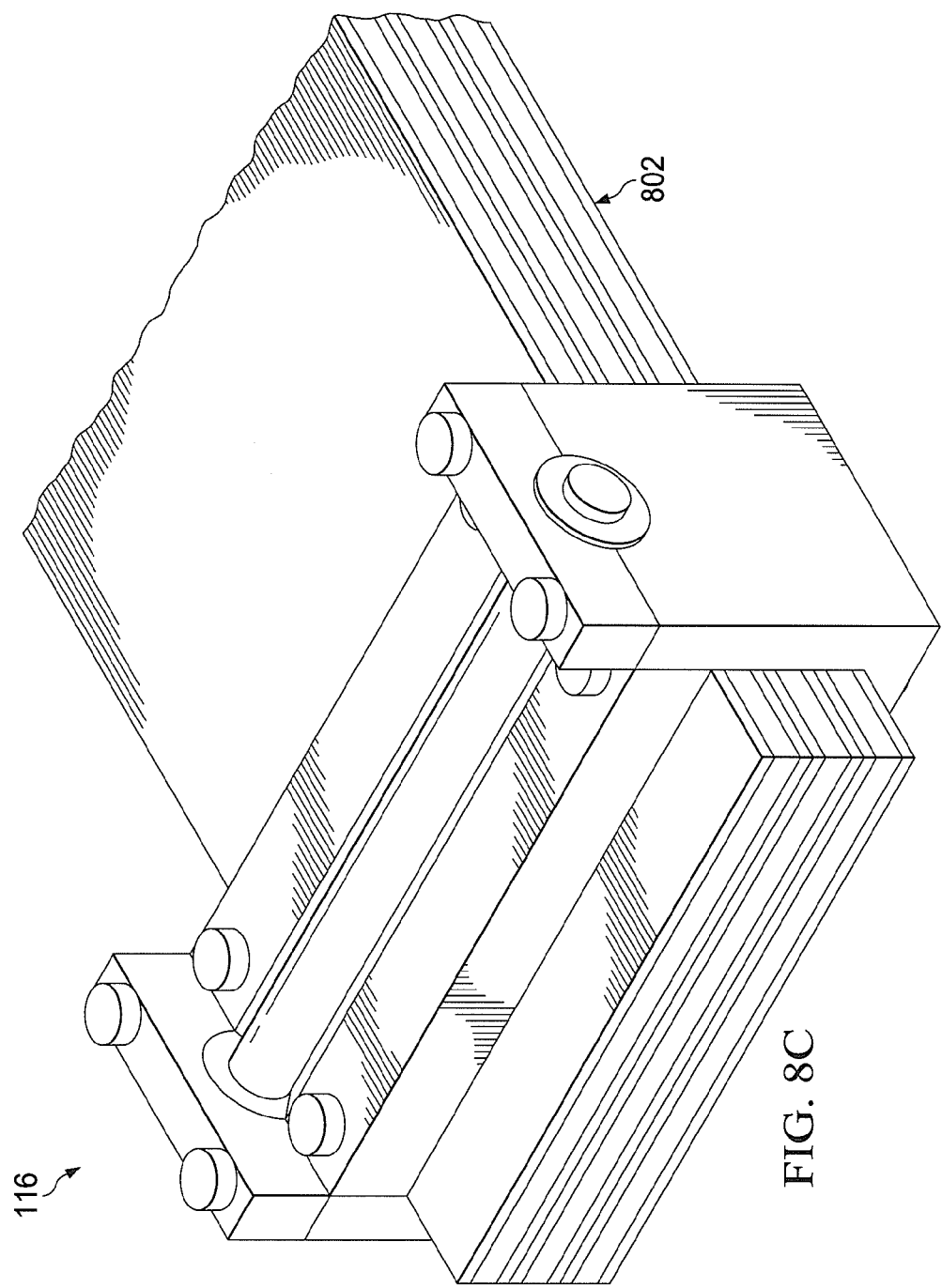
Figure 9:
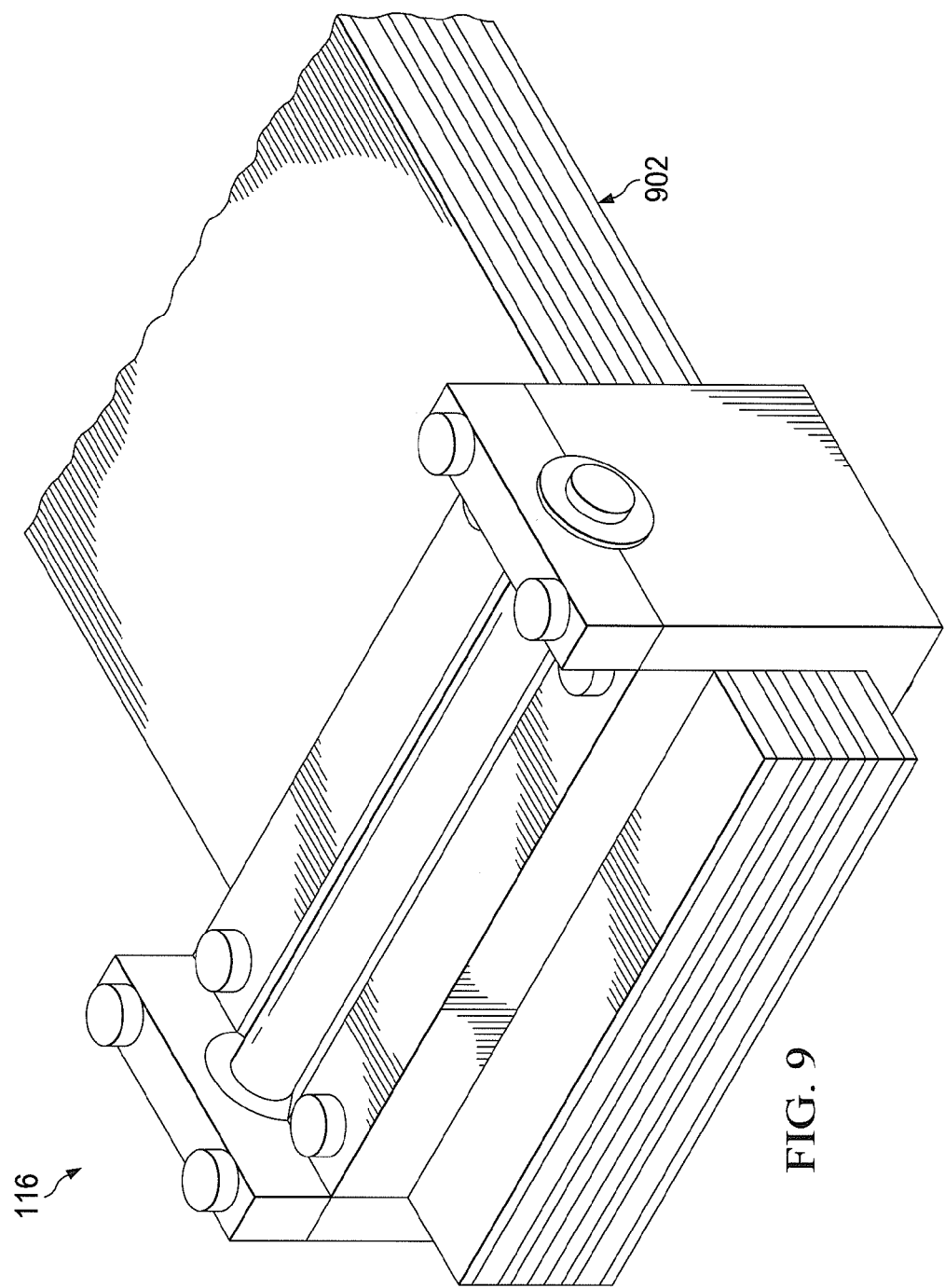

FIGS. 7 through 9 illustrate additional structures with friction damping mechanisms in accordance with this disclosure. As noted above, a three-layer split beam 102 represents one example of the type of beam that could use at least one friction damping clamp 116 to dampen oscillatory movement of the beam. Other types of beams could also be used with the friction damping clamp 116. For example, FIG. 7 shows a beam 702 used with at least one friction damping clamp 116. The beam 702 here includes two thicker outer layers and three thinner inner layers. The beam 702 here has twice as many slip/friction planes than in the beam 102.

FIGS. 8A through 8C show a beam 802 used with at least one friction damping clamp 116, where the beam 802 includes multiple layers 804-808.

Each layer 804-808 here includes harder outer layers and a softer core layer sandwiched between the harder outer layers.

These layers 804-808 provide increased compliance in compression, and the clamp 116 can be much stiffer than the beam stack when the stack is in compression.

FIG. 9 shows a beam 902 used with a friction damping clamp 116, where the beam 902 uses a combination of these approaches. Here, the top and bottom sections of the beam 902 include "sandwiched" layers, and the core of the beam 902 is formed from three thinner inner layers. This softens the beam stack's compression stiffness and doubles the number of slip/friction planes compared to the beam 102.

Although FIGS. 7 through 9 illustrate examples of additional structures with friction damping mechanisms, various changes may be made to FIGS. 7 through 9. For example, any number of other arrangements of a beam could be used with one or more friction damping clamps 116. Moreover, as noted above, friction damping clamps 116 can be used with any suitable types of structures and are not limited to use with cantilevered beams or beams in general.

Figure 10A:
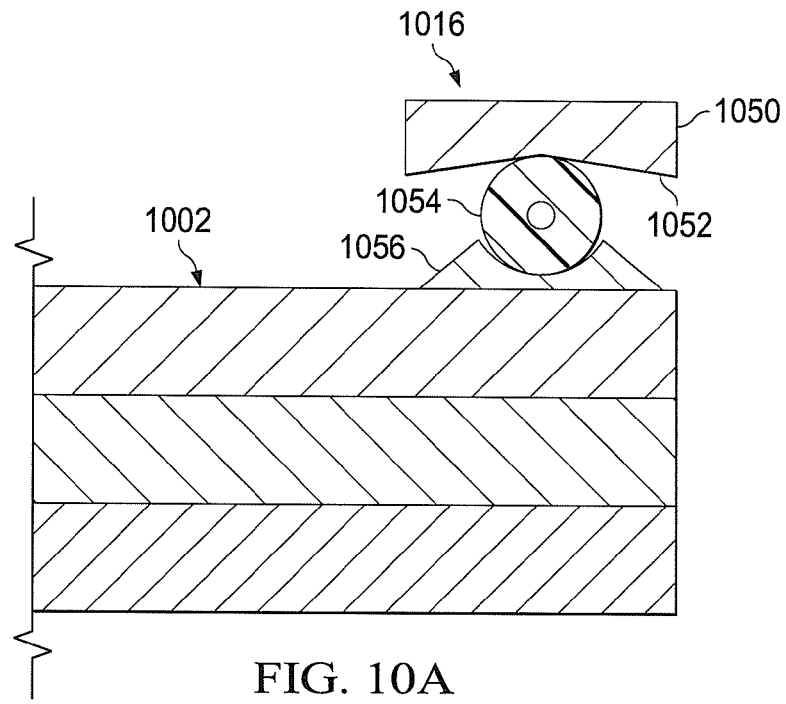
FIGS. 10A and 10B illustrate another example friction damping mechanism in accordance with this disclosure.
Figure 10B:
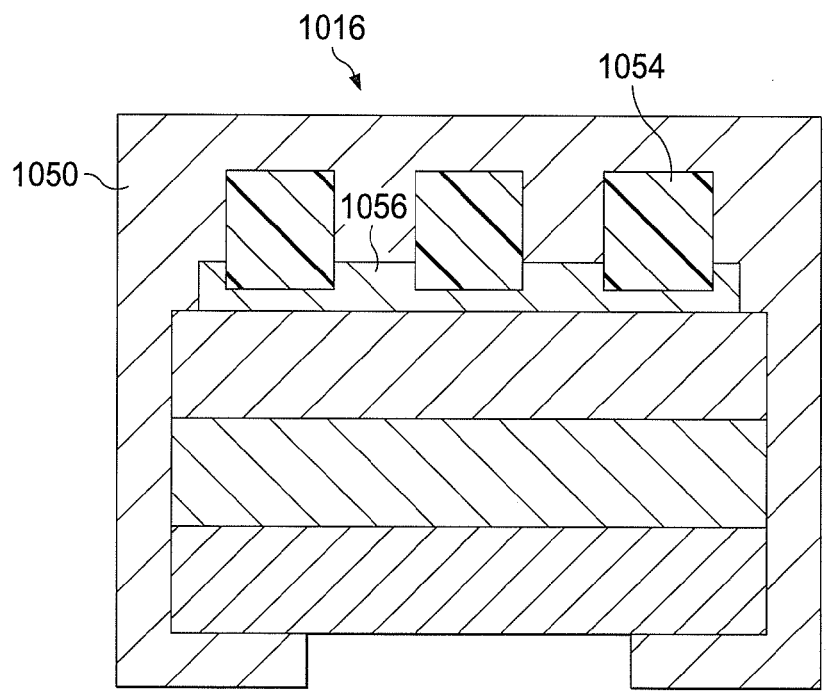

FIGS. 10A and 10B illustrate another example friction damping mechanism in accordance with this disclosure. In particular, FIGS. 10A and 10B illustrate details of another friction damping clamp 1016. FIG. 10A shows a cross-sectional view of the friction damping clamp 1016 taken along a length of a beam 1002, and FIG. 10B shows a cross-sectional view of the friction damping clamp 1016 taken along a width of the beam 1002. The beam 1002 represents a multi-layer beam with three layers, although the beam 1002 could represent any of the beams described above. Also, the friction damping clamp 1016 could be used with structures other than beams, and the beam 1002 or other structure could include any number of friction damping clamps 1016.

In this example, the friction damping clamp 1016 includes a housing 1050, which partially encircles the beam 1002. Note that the housing 1050 could also completely encircle the beam 1002. The housing 1050 includes at least one groove 1052 defining ramps. The friction damping clamp 1016 also includes at least one roller 1054 and a support structure 1056, which could contain bearings for the roller(s) 1054 or otherwise support the roller(s) 1054. The housing 1050 and the support structure 1056 are secured to different layers of the beam 1002 in any suitable manner, such as by using bolts.

The operation of the friction damping clamp 1016 is similar to that of the friction damping clamp 116, but the relative positions of the roller(s) and groove(s) are reversed. That is, in the friction damping clamp 116, the groove 402 is located between the roller 212 and the beam 102. When the roller 212 moves up the groove 402, the roller 212 causes the housing member 204 to apply more compression to the beam 102. When the roller 212 moves down the groove 402, the roller 212 causes the housing member 204 to apply less compression to the beam 102. Similarly, in the friction damping clamp 1016, when the roller 1054 moves up the groove 1052, the roller 1054 causes the support 1056 to apply more compression to the beam 1002. When the roller 1054 moves down the groove 1052, the roller 1054 causes the support 1056 to apply less compression to the beam 1002.

The housing 1050 or the support structure 1056 could be placed at an adjustable distance with respect to the beam 1002. For example, the height of the support structure 1056 over the top layer of the beam 1002 could be adjustable using the bolts or other connectors coupling the support structure 1056 to the top layer of the beam 1002. As another example, the height of the housing 1050 over the top layer of the beam 1002 could be adjustable using the bolts or other connectors coupling the support structure 1056 to the bottom layer of the beam 1002. Again, this allows for the tuning of the friction force applied to the beam 1002.

Note that the directions "up" and "down" are reversed in the friction damping clamps 116 and 1016. In this document, the term "up" (when used with respect to a roller's movement on a ramp of a groove) refers to movement of the roller away from a home position of the roller. Similarly, the term "down" (when used with respect to a roller's movement on a ramp of a groove) refers to movement of the roller towards the home position of the roller. The "home position" of the roller represents the position of the roller in the groove where the roller applies a minimal or no amount of compression to a structure.

Although FIGS. 10A and 10B illustrate another example of a friction damping mechanism, various changes may be made to FIGS. 10A and 10B. For example, the sizes, shapes, and relative dimensions of the components in the friction damping clamp 1016 are for illustration only and may vary depending on particular circumstances. Also, a single roller 1054 or multiple rollers 1054 could be used with one or multiple grooves 1052 to provide friction damping. In addition, the groove 1052 could have other shapes and need not be V-shaped. For instance, the groove 1054 could have a parabolic shape or a step configuration.

Figure 11:
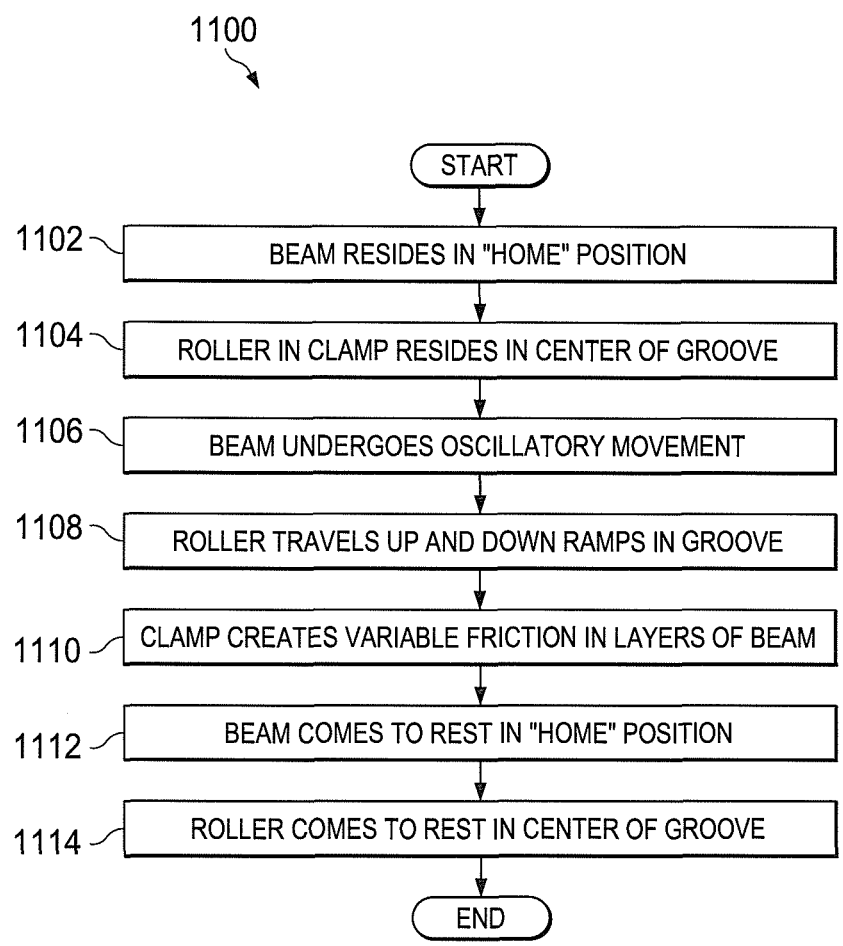
FIG. 11 illustrates an example method of using a friction damping mechanism in accordance with this disclosure.

FIG. 11 illustrates an example method 1100 of using a friction damping mechanism in accordance with this disclosure. The method 1100 is described with respect to the multi-layer beam 102 operating in conjunction with the friction damping clamp 116. The method 1100 could be used with any other suitable structure having any number of friction damping clamps. The method 1100 could also be used with any other suitable friction damping clamp(s), such as the one shown in FIGS. 10A and 10B.

As shown in FIG. 11, a beam resides substantially in its "home" position at step 1102, and at least one roller in a friction damping clamp resides substantially in the center of at least one groove at step 1104. This could include, for example, the end of the beam 102 residing in a known location and the roller(s) 212 of the friction damping clamp 116 residing at the center of the groove(s) 402. In this position, the beam is not experiencing displacement.

The beam begins to undergo oscillatory movement at step 1106. This could include, for example, the end of the beam 102 being displaced and then released, causing the end of the beam 102 to oscillate back and forth. Oscillatory movement of the beam 102 could be created in any other manner. During this time, the at least one roller in the clamp travels up and down the ramps of the at least one groove at step 1108. This could include, for example, each roller 212 moving up and back down the ramp on one side of its groove 402 and then moving up and back down the ramp on another side of its groove 402. This can occur repeatedly until the beam stops moving. As a result of the movement of the roller(s) up and down the ramps of the groove(s), the clamp provides variable friction to the layers of the beam at step 1110. This could include, for example, the clamp 116 creating more friction between the beam layers when each roller 212 is higher on a ramp in its groove 402. This could also include the clamp 116 creating less friction between the beam layers when each roller 212 is lower on a ramp in its groove 402.

Eventually, the beam comes to a rest again substantially in its "home" position at step 1112, and the at least one roller resides substantially in the center of the at least one groove at step 1114. Here, the friction between the layers of the beam 102 causes the beam 102 to come to rest, and the reduced friction present when each roller 212 is located in the center of its corresponding groove 402 causes the beam 102 to stop substantially at its "home" position.

Although FIG. 11 illustrates one example of a method 1100 of using a friction damping mechanism, various changes may be made to FIG. 11. For example, while shown as a series of steps, various steps in FIG. 11 could overlap, occur in parallel, or occur any number of times. As particular examples, steps 1102-1104 can overlap, steps 1106-1111 can overlap, and steps 1112-1114 can overlap.

Note that in the above description, it has been assumed that each groove 402 is symmetrical. However, this need not be the case, as the ramp on one side of a groove 402 could have a different slope that the ramp on another side of the groove 402. This would affect how oscillatory movement of a structure is suppressed, but it may still be acceptable in various circumstances.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a structure configured to undergo oscillatory movement, the structure comprising a beam, at least part of the beam comprising multiple layers that define multiple slip/friction planes within the beam; and
   a friction damping clamp coupled to the structure and at least partially wrapping around the beam, the friction damping clamp comprising:
   a housing having a groove; and
   a roller positioned at least partially within the groove, the groove having first and second ramps;
   wherein the roller is configured to cause increased compression to at least one of the layers of the beam by moving up each ramp of the groove; and
   wherein the roller is also configured to cause reduced compression to at least one of the layers of the beam by moving down each ramp of the groove.

2. The system of claim 1, wherein:
   the roller is configured to cause increased compression to at least one of the layers of the beam in order to increase friction between the multiple layers of the beam; and
   the roller is configured to cause reduced compression to at least one of the layers of the beam in order to decrease friction between the multiple layers of the beam.

3. The system of claim 2, wherein the roller is configured to cause substantially no compression on the beam when the roller is located at a center of the groove.

4. The system of claim 3, wherein the friction damping clamp is configured to cause the structure to return to substantially a same position after each displacement of the structure.

5. The system of claim 1, wherein multiple friction damping clamps are coupled to the structure.

6. The system of claim 1, further comprising:
   one or more anti-buckling rollers positioned along the structure and configured to prevent buckling of the structure.

7. The system of claim 1, wherein at least one of the groove and the roller has an adjustable position with respect to the structure.

8. The system of claim 1, wherein at least two of the layers have different thicknesses.

9. The system of claim 1, wherein the multiple layers include two harder outer layers and a softer inner layer sandwiched between the outer layers.

10. The system of claim 1, wherein the groove comprises a V-shaped groove.

11. An apparatus comprising:
    a friction damping clamp configured to be coupled to a structure that undergoes oscillatory movement, the structure comprising a beam, at least part of the beam comprising multiple layers that define multiple slip/friction planes within the beam, the friction damping clamp configured to at least partially wrap around the beam, the friction damping clamp comprising:
    a housing having a groove; and
    a roller positioned at least partially within the groove, the groove having first and second ramps;
    wherein the roller is configured to cause increased compression to at least one of the layers of the beam by moving up each ramp of the groove; and
    wherein the roller is also configured to cause reduced compression to at least one of the layers of the beam by moving down each ramp of the groove.

12. The apparatus of claim 11, wherein:
    the roller is configured to cause increased compression to at least one of the layers of the beam in order to increase friction between the multiple layers of the beam; and
    the roller is configured to cause reduced compression to at least one of the layers of the beam in order to decrease friction between the multiple layers of the beam.

13. The apparatus of claim 12, wherein the roller is configured to cause substantially no compression on the beam when the roller is located at a center of the groove.

14. The apparatus of claim 13, wherein the friction damping clamp is configured to cause the structure to return to substantially a same position after each displacement of the structure.

15. The apparatus of claim 11, wherein the housing comprises:
    a first housing element configured to be coupled to one part of the structure; and
    a second housing element configured to be coupled to another part of the structure, the second housing element having the groove;
    wherein the roller is configured to cause the first housing element to compress the structure.

16. The apparatus of claim 11, wherein:
    the housing is configured to be coupled to one part of the structure;
    the friction damping clamp further comprises a support structure configured to couple the roller to another part of the structure; and the roller is configured to cause the support structure to compress the structure.

17. The apparatus of claim 11, wherein the friction damping clamp comprises multiple rollers, the rollers positioned at least partially within one or more grooves in the housing.

18. A method comprising:
creating oscillatory movement of a structure, the structure comprising a beam, at least part of the beam comprising multiple layers that define multiple slip/friction planes within the beam; and
damping the oscillatory movement using a friction damping clamp coupled to the structure, wherein the friction damping clamp at least partially wraps around the beam, wherein the friction damping clamp comprises:
a housing having a groove; and
a roller positioned at least partially within the groove, the groove having first and second ramps;
wherein damping the oscillatory movement comprises:
moving the roller up each ramp of the groove to cause increased compression to at least one of the layers of the beam; and
moving the roller down each ramp of the groove to cause reduced compression to at least one of the layers of the beam.

19. The method of claim 18, wherein:
the roller causes increased compression to at least one of the layers of the beam in order to increase friction between the multiple layers of the beam; and
the roller cause reduced compression to at least one of the layers of the beam in order to decrease friction between the multiple layers of the beam.

20. The method of claim 19, wherein the roller causes substantially no compression on the beam when the roller is located at a center of the groove.

* * * * *